Feb. 20, 1940.   H. TIMS   2,191,048
TREE UPROOTER
Filed April 22, 1939   3 Sheets-Sheet 1

Inventor
Hiram Tims
By Clarence A. O'Brien
and Hyman Berman
Attorneys

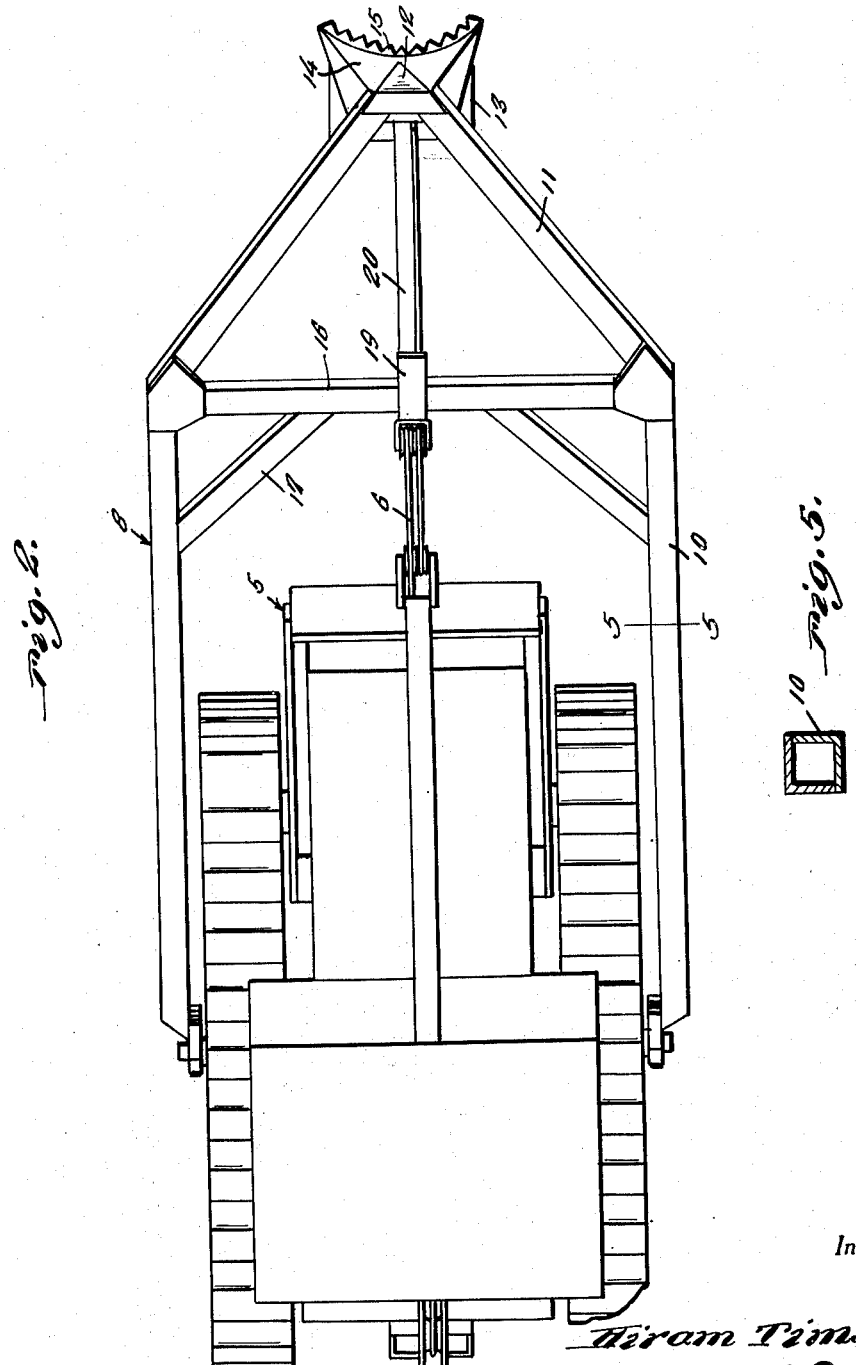

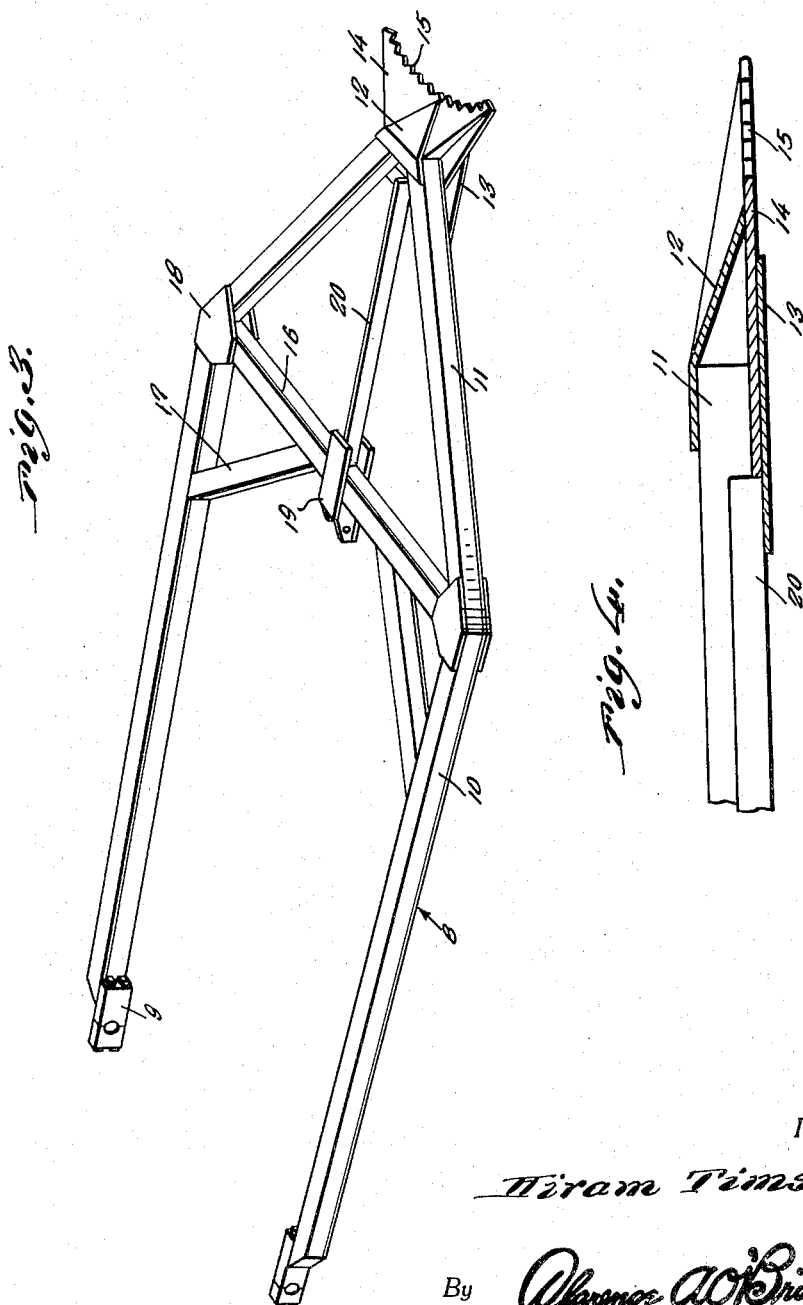

Patented Feb. 20, 1940

2,191,048

UNITED STATES PATENT OFFICE 2,191,048

TREE UPROOTER

Hiram Tims, New Roads, La.

Application April 22, 1939, Serial No. 269,481

1 Claim. (Cl. 37—2)

This invention relates to a tree uprooter and more particularly to an attachment for a tractor or similar motor propelled device equipped with a hoisting means connected to said attachment and the latter hinged on the tractor so that one end portion of the attachment may be readily adjusted to varying heights with respect to the ground or a tree trunk and when engaged with the latter at a selected height, the tractor on being driven forwardly, the tree which may be of a large size in trunk diameter as well as of considerable height will be readily pushed over bringing about uprooting of the tree, and the device may be further employed with a bulldozer action for shoving the tree to a selected place after being uprooted.

With these and other objects in view, the invention consists in certain novel features of construction, combination and arrangement of parts to be hereinafter more fully described and claimed.

For a complete understanding of my invention, reference is to be had to the following description and accompanying drawings, in which Figure 1 is a side elevation illustrating a tractor equipped with an attachment constructed in accordance with my invention and showing the same adjusted to engage a tree trunk at a selected distance from the ground.

Figure 2 is a top plan view illustrating the tractor and the attachment.

Figure 3 is a perspective view illustrating the attachment removed from the tractor.

Figure 4 is a fragmentary sectional view showing the tree engaging head of the attachment.

Figure 5 is a detail sectional view taken on the line 5—5 of Figure 2.

Figure 1:
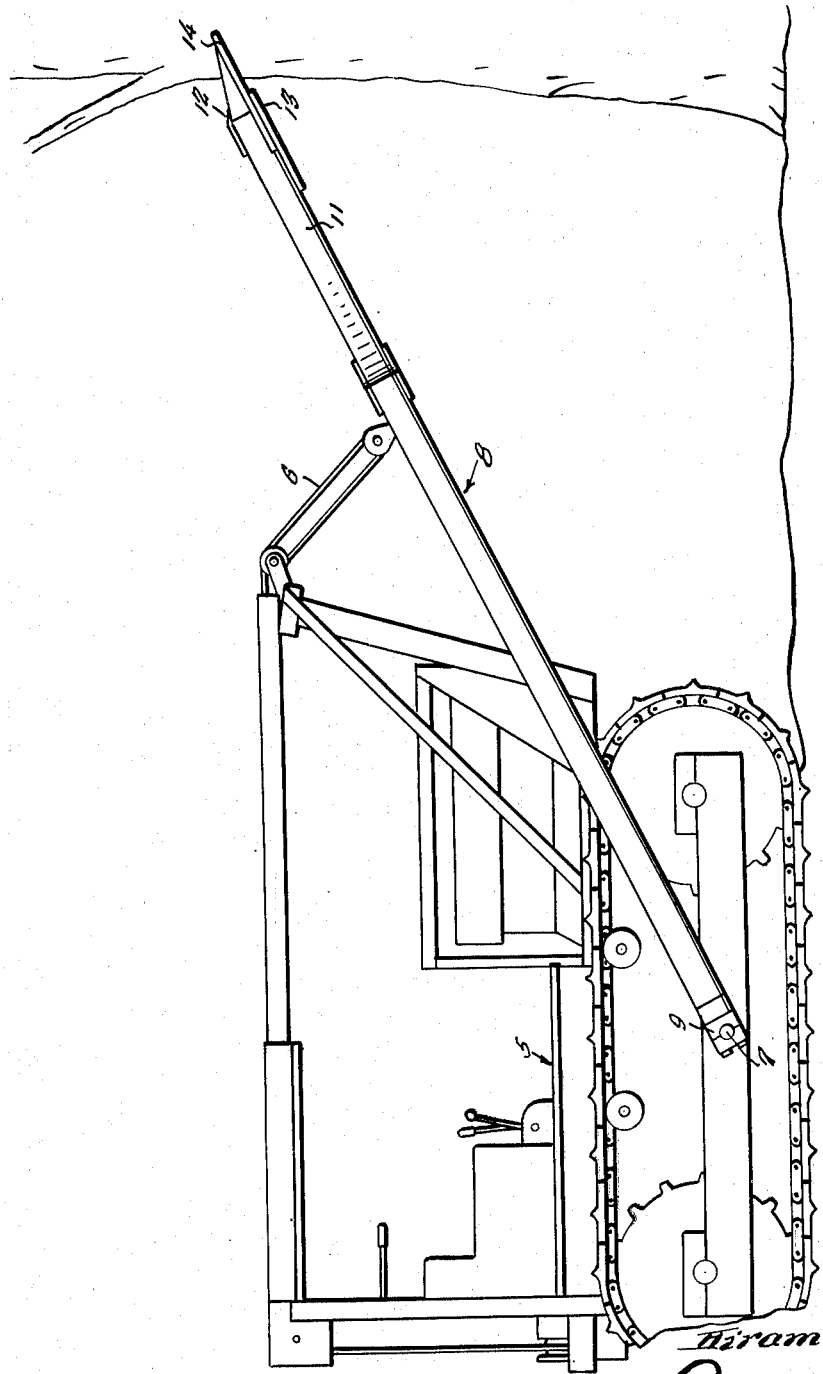

Referring in detail to the drawings, the numeral 5 indicates a conventional type of tractor equipped with a hoist mechanism 6 and as shown in the drawings is of the caterpillar type. I have elected to show the present invention adapted to a tractor of this kind for the sake of convenience and it is to be understood that the attachment is readily adaptable to other types of tractors. The tractor is equipped with the usual stub shaft 7 for connecting thereon a conventional bulldozer (not shown).

In lieu of the conventional type of bulldozer, I propose to mount the attachment, indicated by the character 8, for hinging movement on the stub shafts 7, the attachment being provided with journals 9 to receive the stub shafts.

The attachment is in the form of side members 10 carrying at their rear ends the journals which when mounted on the stub shafts position the side members at opposite sides of the tractor. The side members extend forwardly of the forward end of the tractor and have converging forward end portions 11, the free ends of which terminate in close proximity to each other and on which are secured upper and lower plates 12 and 13. The purpose of the upper and lower plates 12 and 13 is for mounting on the forward end portions a tree engaging plate 14 having an arcuately curved toothed or serrated edge 15.

It is to be understood that the plates 12, 13 and 14 are welded together while the plates 12 and 13 are welded on the converging end portions of the side members providing a very rigid and durable construction.

A cross brace 16 connects the side members where the converging portions extend angularly to the parallel portions of said side members. The side members are also strengthened by braces 17 extending from the brace 16 to said side members in a diagonal manner. Cap plates 18 are welded on the side members and cross brace, also the latter intermediate its ends has secured thereon a hoist attaching medium or bracket 19 to which the hoist 6 is connected. A forwardly arranged brace 20 connects the brace 16 with the forward end portions of the side members by being welded onto the lower plate 13 and has the rear edge of the tree engaging plate in engagement therewith.

The side members and brace 16 may be of hollow formation and of substantially rectangular shape in cross section, preferably being formed by a pair of angle iron members brought in abutting relation and welded together. While I have described the braces and members as being welded together it is to be understood other means of fastening these parts together may be employed.

In operation, the free end of the attachment is elevated to a selected height from the ground by the hoist 6 and the tractor is driven forwardly to bring the plate 14 in contact with the trunk of the tree, as shown in Figure 1. A further forward movement of the tractor will uproot the tree with comparative ease and after the tree has been uprooted, the tractor is reversed in movement to clear the attachment of the tree or roots thereof and is lowered to bring the tree engaging plate 14 into engagement with the base or roots of the tree to further push the tree from an embedded position in the ground. After the tree has been freed from the ground the latter may be readily pushed to any selected place by the attachment and the tractor.

This device is economical to manufacture and may be readily adapted to a tractor and is easily operated to bring the forward end portions thereof into engagement with a trunk of a tree at a selected distance from the ground. Through the use of the device on a tractor a comparatively large area of ground may be cleared of trees within a comparatively short period of time, that is, the trees may be quickly uprooted and freed from the ground and brought to a selected place.

It is believed that the foregoing description, when taken in connection with the drawings will fully set forth the construction and advantages of this invention to those skilled in the art to which such a device relates, so that further detailed description will not be required.

Having thus described my invention, what I claim is:

A tree uprooting device for attachment to a tractor having an overhead cable hoist, said device comprising a yoke-like frame including parallel side bars having rear ends adapted for pivotal connection to opposite sides of the tractor, respectively, for vertical swinging movement of said bars, a cross bar connecting the front ends of said side bars, a pair of forwardly converging pusher bars extending from the front ends of said side bars, respectively, a pair of upper and lower spaced apart plates connecting the front ends of said pusher bars, a tree engaging plate fixed between said pair of plates to be braced laterally thereby and having a serrated front edge for engagement with a tree, a brace bar extending from said cross bar centrally thereof and having a front end disposed between said pair of plates and bearing against the rear edge of the tree engaging plate to back the same, and means at the juncture of said cross bar and brace bar for the attachment of said cable thereto.

HIRAM TIMS.